Dec. 12, 1961    C. E. BRADLEY    3,012,632
REAR CHAIN OILER FOR MOTORCYCLE
Filed June 15, 1959
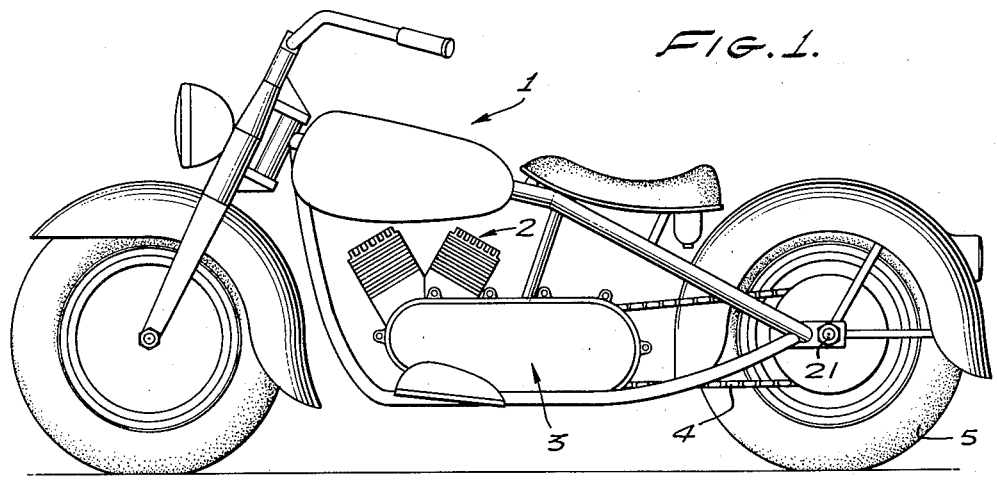
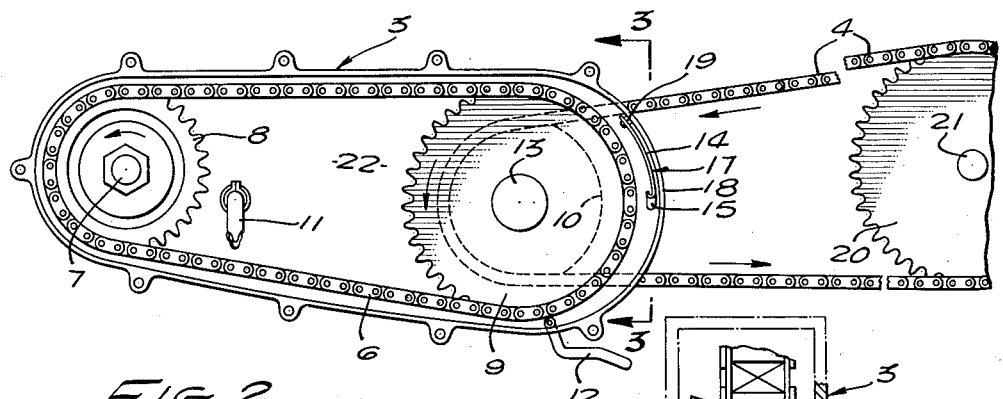
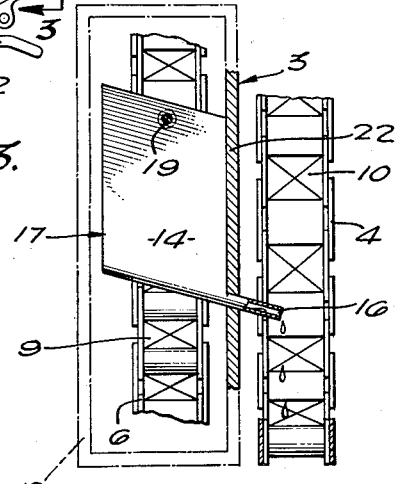
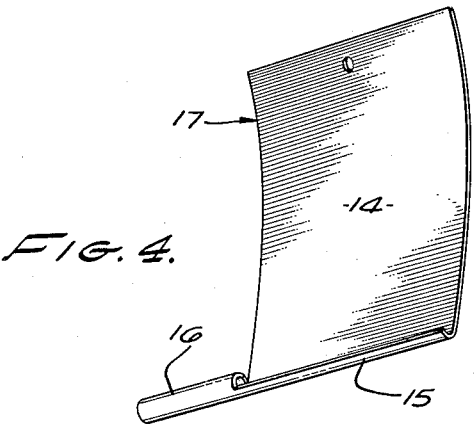
INVENTOR.
CECIL E. BRADLEY
BY
Eugene O. Heberer
ATTORNEY

United States Patent Office 3,012,632
Patented Dec. 12, 1961

3,012,632
REAR CHAIN OILER FOR MOTORCYCLE
Cecil E. Bradley, 1235 W. 2nd St., Pomona, Calif.
Filed June 15, 1959, Ser. No. 820,493
4 Claims. (Cl. 184—15)

This invention relates to a rear chain oiler for motorcycles and, more particularly, is directed to an oiler located in the front chain housing where it collects oil and delivers it by gravity to the rear chain externally of the housing.

This invention is a continuation-in-part of my copending application Serial No. 782,331 filed December 22, 1958, entitled Motorcycling, now abandoned.

In the prior art, in the larger and better motorcycles manufactured in the United States since 1936, the forward chain is enclosed in a housing and receives pumped oil by a drip feed within the housing where the oil by the action of the chain sprocket wheels is vaporized into a mist. This mist condenses partly during operation and further during the stoppage of the motorcycle and is permitted to drain from the housing by means of a drain tube. Thus, all the oil which is used to lubricate the front chain and front sprocket wheels is allowed to drain away as waste. By this system, the rear chain must be lubricated by hand with an engine oil about every 500 miles and under dusty, wet or muddy conditions, the chain must be oiled daily with a very light oil. Motorcycles used by the police are generally in the category of having rear chains which must be oiled daily.

According to the present invention, it has been found that by placing a small oil collecting plate within the housing rearward of the chain a sufficient amount of oil can be collected in a channel formed at the lower edge of the plate whereby the oil in the channel will flow downwardly through a spout attached to the plate and extending outwardly of the housing to a position over the lower portion of the rear chain so as to lubricate the rear chain and rear sprocket wheels.

This eliminates the need for hand-oiling of the rear chain regardless of the extent of and kind of use of the motorcycle and likewise the oiling of the sprocket wheels which are engaged with the rear chain. One of the advantages provided by the present invention is the prolonging of the life of the rear chain and the sprocket wheels. Further, no additional oil is required over that which is normally applied to the front chain. By collecting the oil in the mist formed while in the forward chain housing and delivering it to the rear chain rather than letting it go to waste as in the prior art, it has been found that approximately two quarts of oil per 1000 miles is saved in the use of the present invention.

It is therefore an object of the present invention to provide an improved rear chain oiler for a motorcycle.

It is a principal object of the present invention to provide a rear chain oiler for a motorcycle which collects oil within the forward chain housing and, by gravity flow, delivers it to the rear chain.

It is a further object of the present invention to provide a rear chain oiler which has no moving parts and which requires no adjustment.

Other objects of the invention will become apparent from the following description taken in connection with the accompanying drawings, in which:

FIG. 1 is a side elevation view of a motorcycle;

FIG. 2 is a fragmentary view of the interior of the front chain housing and the rear chain and sprocket wheels;

FIG. 3 is a fragmentary view taken along the line 3—3 of FIG. 2 showing the relationship between the front chain, the rear chain and the rear chain oiler; and FIG. 4 is a preferred embodiment of the rear chain oiler.

Referring to the drawings, FIG. 1 shows a motorcycle 1 having an engine 2. On one side of the engine is the front chain housing 3 into which extends the engine drive shaft 7. Drive sprocket wheel 8 is mounted for rotation on drive shaft 7 at one end of the housing and at the rear end of the housing rear sprocket wheel 9 is mounted for rotation on clutch shaft 13. Endless front chain 6 is engaged with sprocket wheels 8 and 9 so that when sprocket wheel 8 is rotated by rotation of drive shaft 7, clutch shaft 13 will be rotated by means of chain 6 and sprocket wheel 9. Front sprocket wheel 10, shown in broken lines only, is typically mounted on clutch shaft 13 to drive rear chain 4. Rear sprocket wheel 20 driven by the rear chain is typically mounted on the rear axle 21 of rear wheel 5 of the motorcycle.

Thus, in the normal operation of the motorcycle, sprocket wheel 8 is driven by drive shaft 7 so as to cause the movement of front chain 6, which in turn rotates sprocket wheel 9, shaft 13 and sprocket wheel 10. The rotation of sprocket wheel 10 causes the movement of the rear chain 4 in the direction of the arrows so as to rotate sprocket wheel 20 and rear motorcycle wheel 5 and thus, move the motorcycle in the forward direction.

During the aforesaid operation, oil feed tube 11, connected to a lubricating pump and extending into closed housing 3, typically provides a downwardly directed, slow feed means so as to lubricate forward chain 6. As the chain is moved, the sprocket wheels 8 and 9 are likewise lubricated. The movement of the chain and sprocket wheels in the enclosed housing 3 causes the oil to be vaporized into a mist which tends to be moved by the lower portion of the chain to the rear of the housing. Rear chain oiler 17, as indicated in FIG. 4, is comprised of the plate member 14, which may be curved as shown in FIG. 2 to conform with the rear housing wall 18. Plate 14 terminates at its lower end in a looped portion which forms channel 15. Spout 16 may be integral with downwardly sloped channel 15 and extends outwardly and downwardly from the housing over the lower portion of rear chain 4. Chain oiler 17 may be secured within the housing by a screw 19 extending into the rear wall 18 so that the oiler will provide a gravity flow downwardly toward the lower portion of the rear chain.

In FIG. 3, the rear chain oiler 17 is shown to be in contact with the side wall 22 of housing 3 so as to aid the oil to flow into the channel 15. Spout or tube 16 extends through an opening in side wall 22 of housing 3 so as to terminate outwardly immediately above the lower portion of rear chain 4.

Thus, as the oil is thrown to the rearward by the action of the chain 6, a considerable portion of its collects on the surface of plate 14 and runs downwardly into channel 15 and spout 16. The amount thereby collected is sufficient to keep the rear chain 4 and the rear sprocket wheels 10 and 20 in a continuous and proper state of lubrication. The remainder of the oil in housing 3 and uncollected by rear chain oiler 17 is permitted to drain out of the conventional drain tube 12 extending outwardly from a lower portion of the housing.

In summary, it should be clear from the foregoing that the present invention has provided a new and practical means for oiling and preserving the rear chain and rear sprocket wheels of a motocycle.

Although the invention has been described and illustrated in detail, it is clearly understood that the same is by way of limitation, the spirit and scope of this invention being limited by the terms of the appended claims.

What is claimed is:

1. In a motorcycle having front and rear endless chains;

said front chain being enclosed within a housing; said front chain being engaged with a first driving sprocket wheel mounted on the motorcycle engine drive shaft and with a first driven sprocket wheel mounted on the motorcycle clutch shaft; said rear chain being engaged with a second driving sprocket wheel on said clutch shaft and a second driven sprocket wheel mounted on the axle of the rear wheel of the motorcycle; a drip oil feed line in said housing directed to permit oil to flow onto a part of said front chain; an oil drain from said housing; the improvement comprising: oil collecting means secured to an inner rear wall of said housing outwardly and rearwardly of said front chain; said collecting means having a downwardly directed plate portion terminating in a sloping channel portion within said housing; and a spout means extending from said channel portion outwardly of said housing; said spout means sloping in the same direction as said channel portion and extending over a portion of said rear chain to permit oil to flow out of said spout means and downwardly onto said rear chain.

2. In a motorcycle having front and rear endless chains; said first chain being enclosed within a housing; said front chain being engaged with a first driving sprocket wheel mounted on the motorcycle engine drive shaft and with a first driven sprocket wheel mounted on the motorcycle clutch shaft; said rear chain being engaged with a second driving sprocket wheel on said clutch shaft and with a second driven sprocket wheel mounted on the axle of the rear wheel of the motorcycle; a drip oil feed line in said housing directed to permit oil to drop on a lower part of said front chain; an oil drain from said housing; the improvement comprising: oil collecting means secured in said housing; said oil collecting means having a generally vertical plate portion; said plate portion terminating at its lower end in an upwardly open channel forming portion; and tube means connected to said channel portion extending outwardly of said housing to a position over a portion of said rear chain; said channel portion and tube means sloping downward to said portion of said rear chain so as to permit oil to flow from said channel portion into said tube portion and downwardly onto said rear chain.

3. A rear chain oiler for use in a motorcycle having a drip feed to oil the front chain of said motorcycle; said front chain being enclosed in a housing; said rear chain oiler comprising a vertically directed plate portion; said plate portion having a lower end thereof terminating in an upwardly open and downwardly sloped channel portion; said channel portion extending the substantial width of said plate portion and sloping toward one side thereof; and a sloping tube extending laterally from said one side of said plate portion and being integral with said channel portion; said channel portion being in sloping alignment with the lower inner surface of said tube.

4. A chain oiler adapted to be used in a motorcycle of the type having front and rear endless chains connected in series between the drive shaft of the motor and the axle of the rear wheel to drive the motorcycle, one of said chains being enclosed within a housing, and means to lubricate said one chain within said housing with oil; said chain oiler being adapted to collect a portion of said oil in said housing and carry it to lubricate the other of said chains; said chain oiler comprising: a plate portion being securable on a wall of said housing; said plate portion having a lower end thereof terminating in an upwardly open and downwardly sloped oil collecting portion; said oil collecting portion sloping toward one side of said plate portion; and as loping extension extending laterally from said one side of said plate portion and being integral with said oil collecting portion; said oil collecting portion being in sloping alignment with said extension; said extension being adapted to extend outside of said housing.

References Cited in the file of this patent

UNITED STATES PATENTS

| | | |
|---|---|---|
| 1,868,198 | Dow | July 19, 1932 |
| 2,654,441 | Orr et al. | Oct. 6, 1953 |
| 2,930,448 | Burnham | Mar. 29, 1960 |